(12) United States Patent
Kawai (10) Patent No.: US 9,493,207 B2
(45) Date of Patent: Nov. 15, 2016

(54) MOTORCYCLE

(71) Applicant: KAWASAKI JUKOGYO KABUSHIKI KAISHA, Kobe-shi, Hyogo (JP)

(72) Inventor: Hideaki Kawai, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/873,121

(22) Filed: Oct. 1, 2015

(65) Prior Publication Data

US 2016/0096583 A1  Apr. 7, 2016

(30) Foreign Application Priority Data

Oct. 2, 2014  (JP) ................. 2014-203801

(51) Int. Cl.
*B62K 11/04* (2006.01)
*B62K 25/04* (2006.01)
*B60K 13/04* (2006.01)
*B62K 25/28* (2006.01)

(52) U.S. Cl.
CPC ............... *B62K 25/04* (2013.01); *B60K 13/04* (2013.01); *B62K 11/04* (2013.01); *B62K 25/286* (2013.01)

(58) Field of Classification Search
CPC ...... B62K 25/04; B62K 11/04; B62K 11/00; B62K 25/286
USPC ........................................................ 180/227
See application file for complete search history.

(56) References Cited

U.S. PATENT DOCUMENTS

| | | | | | |
|---|---|---|---|---|---|
| 4,489,803 A * | 12/1984 | Fukuchi | ............... | B62K 25/286 | 180/227 |
| 4,673,053 A * | 6/1987 | Tanaka | ................. | B62K 25/286 | 180/227 |
| 4,781,264 A * | 11/1988 | Matsuzaki | ............. | B62K 11/04 | 180/219 |
| 6,290,017 B1 * | 9/2001 | Ito | .......................... | B62K 11/06 | 180/219 |
| 7,438,149 B2 * | 10/2008 | Ishida | .................... | B62K 25/20 | 180/227 |
| 7,547,030 B2 * | 6/2009 | Toyoda | ................ | B62K 25/283 | 180/227 |
| 7,665,563 B2 * | 2/2010 | Misaki | ................. | B62K 25/283 | 180/227 |
| 8,919,482 B2 * | 12/2014 | Matsuda | ................ | B62K 11/04 | 180/220 |
| 2006/0283650 A1 * | 12/2006 | Kawamura | ............ | B62K 19/06 | 180/227 |
| 2008/0236152 A1 * | 10/2008 | Morita | ...................... | F01N 3/10 | 60/324 |
| 2011/0079458 A1 * | 4/2011 | Nishiyama | ........... | B62K 25/283 | 180/227 |

FOREIGN PATENT DOCUMENTS

| | | |
|---|---|---|
| EP | 0825099 A2 | 2/1998 |
| EP | 2468612 A1 | 6/2012 |
| JP | 2012192858 A | 10/2012 |
| WO | 9929562 A1 | 6/1999 |

OTHER PUBLICATIONS

European Patent Office, Extended European Search Report Issued in Application No. 15187443.5, Mar. 15, 2016, 10 pages.

* cited by examiner

*Primary Examiner* — Anne Marie Boehler
*Assistant Examiner* — Michael Stabley
(74) *Attorney, Agent, or Firm* — Alleman Hall McCoy Russell & Tuttle LLP (57) ABSTRACT

A motorcycle comprises a front wheel; a rear wheel; a seat; a vehicle body frame; a swing arm which supports the rear wheel such that the swing arm is vertically pivotable around a location at which the swing arm is connected to a front frame; and a rear suspension which connects the vehicle body frame to the swing arm via a link mechanism, wherein a seat frame includes a pair of rail sections having rear end portions which are placed to be spaced apart from each other on both sides in a vehicle width direction relative to the rear wheel and located above an axle of the rear wheel, and wherein the rear suspension is placed on one side in the vehicle width direction relative to a vehicle body center line extending in a forward and rearward direction and extends in the forward and rearward direction.

7 Claims, 9 Drawing Sheets

MOTORCYCLE

CROSS-REFERENCE TO THE RELATED APPLICATION

This application claims priority to and the benefit of Japanese Patent Application No. 2014-203801, filed on Oct. 2, 2014, the entire disclosure of which is incorporated herein by reference.

BACKGROUND OF THE INVENTION

1. Field of the Invention

The present invention relates to a motorcycle.

2. Description of the Related Art

An exemplary motorcycle is provided with front and rear suspensions between a front wheel and a vehicle body frame, and between a rear wheel and the vehicle body frame, respectively, in order to damp an impact generated from a road surface during driving of the motorcycle. For example, a swing arm is coupled to the vehicle body frame, via the rear suspension placed between the rear wheel and the vehicle body frame and in the vicinity of the center of a vehicle body in a vehicle width direction.

Known types of motorcycles include an American type and a cruiser type. Typically, the motorcycle of the American type is designed and developed with attention to, for example, improving comfort and obtaining a more comfortable ride for a rider or a passenger. In an exemplary motorcycle of the American type, the height of a rider seat is reduced so that the rider can easily ground their feet (see e.g., Japanese Laid-Open Patent Application Publication No. 2012-192858).

SUMMARY OF THE INVENTION

However, in a layout in which the rear suspension extends vertically, the height of the seat is increased. In addition, in a configuration in which the rear suspension is directly mounted to the swing arm, the stroke amount of the rear suspension is reduced to prevent an interference between the rear suspension and components located in the vicinity of the rear suspension. As a result, a comfortable ride cannot be obtained.

In view of the above, an object of the present invention is to provide a more comfortable ride, while reducing the height of a seat in a motorcycle.

According to an aspect of the present invention, a motorcycle comprises a front wheel; a rear wheel; a seat placed between the front wheel and the rear wheel; a vehicle body frame including a front frame supporting the front wheel, and a seat frame connected to the front frame and supporting the seat; a swing arm which is rotatably connected to the front frame and supports the rear wheel such that the swing arm is vertically pivotable around a location at which the swing arm is connected to the front frame; and a rear suspension which connects the vehicle body frame to the swing arm via a link mechanism and serves to damp a pivot motion of the swing arm, wherein the seat frame includes a pair of rail sections having rear end portions which are placed to be spaced apart from each other on both sides in a vehicle width direction relative to the rear wheel and located above an axle of the rear wheel, and wherein the rear suspension is placed on one side in the vehicle width direction relative to a vehicle body center line extending in a forward and rearward direction and extends in the forward and rearward direction.

In accordance with this configuration, since the rear end portions of the seat frame are placed to be spaced apart from each other on the both sides in the vehicle width direction relative to the rear wheel, an interference between the rear wheel and the seat frame can be prevented, and therefore the height of the seat can be reduced. Also, since the rear suspension is placed to extend in the forward and rearward direction, the height of the seat can be reduced as compared to a case where the rear suspension is placed to extend vertically. For these reasons, the rider can ground their feet more easily. Further, since the rear suspension is coupled to the swing arm via the link mechanism, extends in the forward and rearward direction, and is placed on one side in the vehicle width direction relative to the vehicle body center line, the amount of extension and contraction of the rear suspension with respect to the amount of the pivot motion of the swing arm can be increased. In this way, a more comfortable ride can be obtained.

In the above-described motorcycle, the seat frame may include: a front section extending rearward from the front frame and supporting the seat; a pair of branch sections extending rearward from a rear end portion of the front section, forming a spacing between the branch sections in the vehicle width direction; and a pair of rear sections located on right and left sides relative to the rear wheel and extending rearward from rear end portions of the pair of branch sections, respectively, wherein the pair of rail sections may include the branch sections and the rear sections, and wherein the rear suspension may be placed laterally in the vehicle width direction relative to the front section.

In accordance with this configuration, since the rear suspension is placed adjacent to the front section of the seat frame in the vehicle width direction, an interference between the rear suspension and the seat frame can be prevented, and the region in which the rear suspension is extended and contracted in the forward and rearward direction can be ensured easily.

In the above-described motorcycle, the rear suspension may be connected to one side of a rear end portion of the front frame in the vehicle width direction.

In accordance with this configuration, since the front end portion of the rear suspension is placed on one side in the vehicle width direction, the region in which the rear suspension is extended and contracted in the forward and rearward direction can be ensured more easily.

In the above-described motorcycle, the link mechanism may include: a suspension coupling section rotatably coupled to the rear suspension; a swing arm coupling section rotatably coupled to the swing arm; and a front frame coupling section rotatably coupled to the front frame, and the suspension coupling section may be placed in such a manner that a center axis of the suspension coupling section in the vehicle width direction, the center axis extending in the forward and rearward direction, is located outward in the vehicle width direction relative to at least one of a center axis of the swing arm coupling section in the vehicle width direction, extending in the forward and rearward direction, and a center axis of the front frame coupling section in the vehicle width direction, extending in the forward and rearward direction.

In accordance with this configuration, the rear suspension can be placed outward in the vehicle width direction relative to the swing arm, and the portion of the rear suspension which is connected to the swing arm or the front frame can be placed inward in the vehicle width direction. This makes it possible to reduce the dimension in the vehicle width direction, of the swing arm or the front frame.

In the above-described motorcycle, the link mechanism may include a first link member and a second link member, the first link member may include: the suspension coupling section rotatably coupled to a rear end portion of the rear suspension; the swing arm coupling section rotatably coupled to the swing arm; and a second link member coupling section rotatably coupled to the second link member, the suspension coupling section, the swing arm coupling section, and the second link member coupling section of the first link member may be provided at different positions, the second link member may include: a first link member coupling section rotatably coupled to the second link member coupling section of the first link member; and the front frame coupling section rotatably coupled to the front frame, the first link member coupling section and the front frame coupling section of the second link member may be provided at different positions, the center axis of the swing arm coupling section may be located inward in the vehicle width direction relative to the center axis of the suspension coupling section, and the center axis of the front frame coupling section may be located inward in the vehicle width direction relative to the center axis of the swing arm coupling section.

In accordance with this configuration, each of the swing arm coupling section and the front frame coupling section is offset inward in the vehicle width direction, and therefore, the link mechanism is offset in two stages. Therefore, an interference between the swing arm and the second link member can be prevented, and the front frame coupling section of the second link member can be placed inward in the vehicle width direction more easily. This makes it possible to reduce the dimension of the motorcycle in the vehicle width direction. As a result, the rider can ground their feet more easily.

In the above-described motorcycle, the swing arm may include a portion passing through a space that is rightward relative to the second link member, and a region of the portion of the swing arm passing through the space that is rightward relative to the second link member, the region facing the second link member, may have a recess which is concaved outward in the vehicle width direction.

In accordance with this configuration, since the region of the portion of the swing arm passing through the space that is rightward relative to the second link member, which faces the second link member, has the recess which is concaved outward in the vehicle width direction, the swing arm can be placed inward in the vehicle width direction without an interference with the second link member. This makes it possible to reduce the dimension of the vehicle body in the vehicle width direction. As a result, the rider can ground their feet more easily.

The above-described motorcycle may further comprise a muffler; and a muffler mounting bracket supporting the muffler, the front frame may be provided with a pivot shaft supporting the swing arm such that the swing arm is pivotable, the front frame may include an intermediate support member supporting an intermediate portion of the pivot shaft, and end portion support members supporting both end portions of the pivot shaft in the vehicle width direction, respectively, and a portion of the front frame which is coupled to the link mechanism may be provided between the intermediate support member and the end portion support member located on one side in the vehicle width direction and integrated with the muffler mounting bracket.

In accordance with this configuration, the link mechanism is coupled to the portion of the front frame which is provided between the intermediate support member and the end portion support member located on one side in the vehicle width direction. If an upward load generated from the rear wheel is transmitted via the swing arm to the portion where the link mechanism and the front frame are coupled to each other, this load can be dispersed to both of the intermediate support member and the end portion support member located on one side in the vehicle width direction. This makes it possible to reduce the stiffness required for the end portion support member of the front frame supporting the pivot shaft, which can contribute to reduction of the weight of the end portion support member located on one side in the vehicle width direction. Further, since the portion where the link mechanism and the front frame are coupled to each other is integrated with the muffler mounting bracket, the number of members can be reduced. Therefore, a decrease in the number of member can be realized while reducing the weight of the end portion support member of the front frame.

The above-described motorcycle may further comprise a motor; a driving power transmission mechanism which transmits driving power from the motor to the rear wheel; and a side stand, and the driving power transmission mechanism and the side stand may be placed on the other side in the vehicle width direction.

In accordance with this configuration, since the driving power transmission mechanism and the side stand are placed on the other side in the vehicle width direction relative to the vehicle body center line, which is opposite to one side in the vehicle width direction relative to the vehicle body center line, on which the rear suspension is placed, it becomes possible to prevent an interference of the rear suspension with the driving power transmission mechanism (e.g., chain, belt, etc.) and the side stand. In addition, since the rear suspension can be noticed easily, the external appearance of the motorcycle can be improved.

The above and further objects, features, and advantages of the present invention will more fully be apparent from the following detailed description of the preferred embodiment with accompanying drawings.

DETAILED DESCRIPTION OF THE EMBODIMENTS

Hereinafter, the embodiment of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction of a vehicle body corresponds with a rightward and leftward direction.

[Configuration of Motorcycle]

Figure 1:
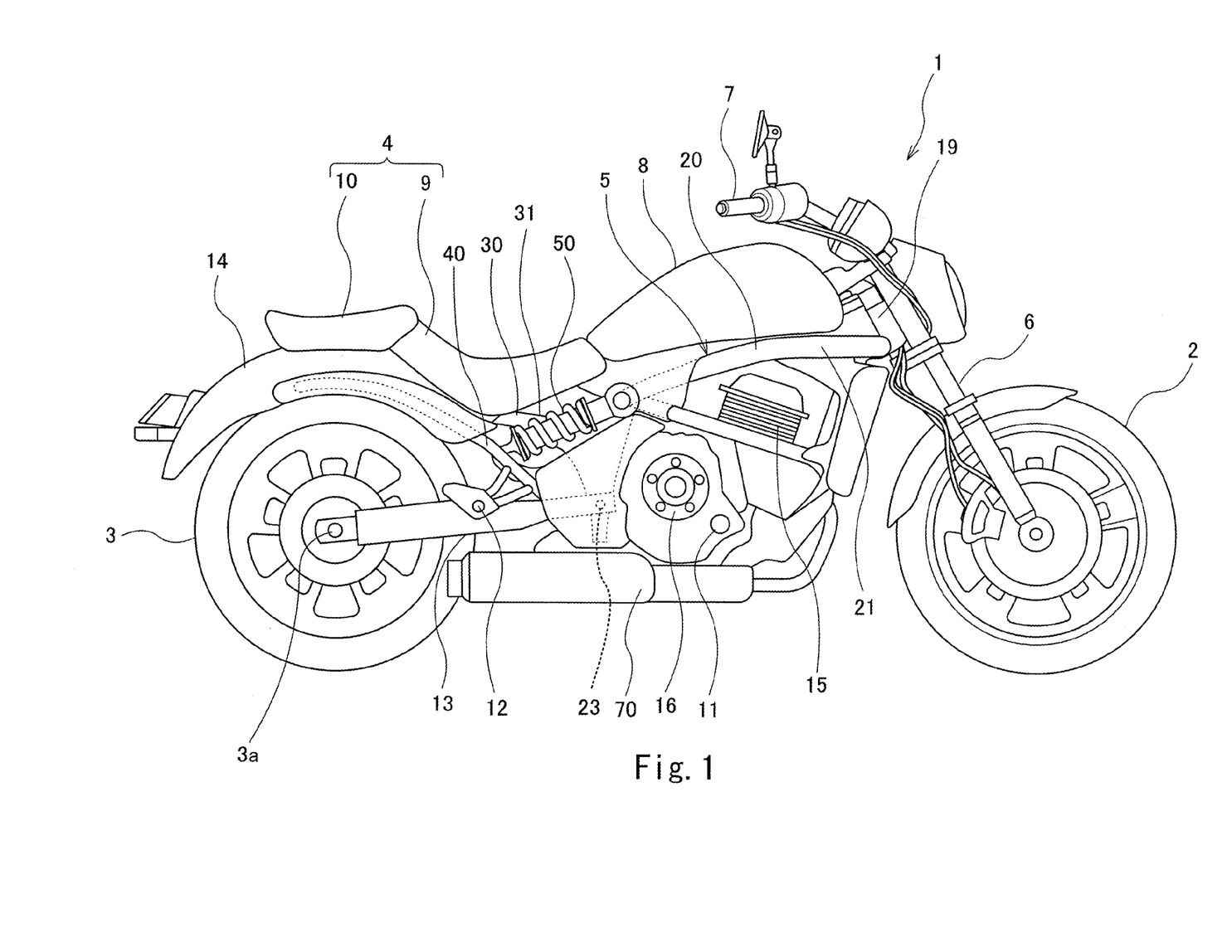
FIG. 1 is a right side view of a motorcycle according to an embodiment.
Figure 2:
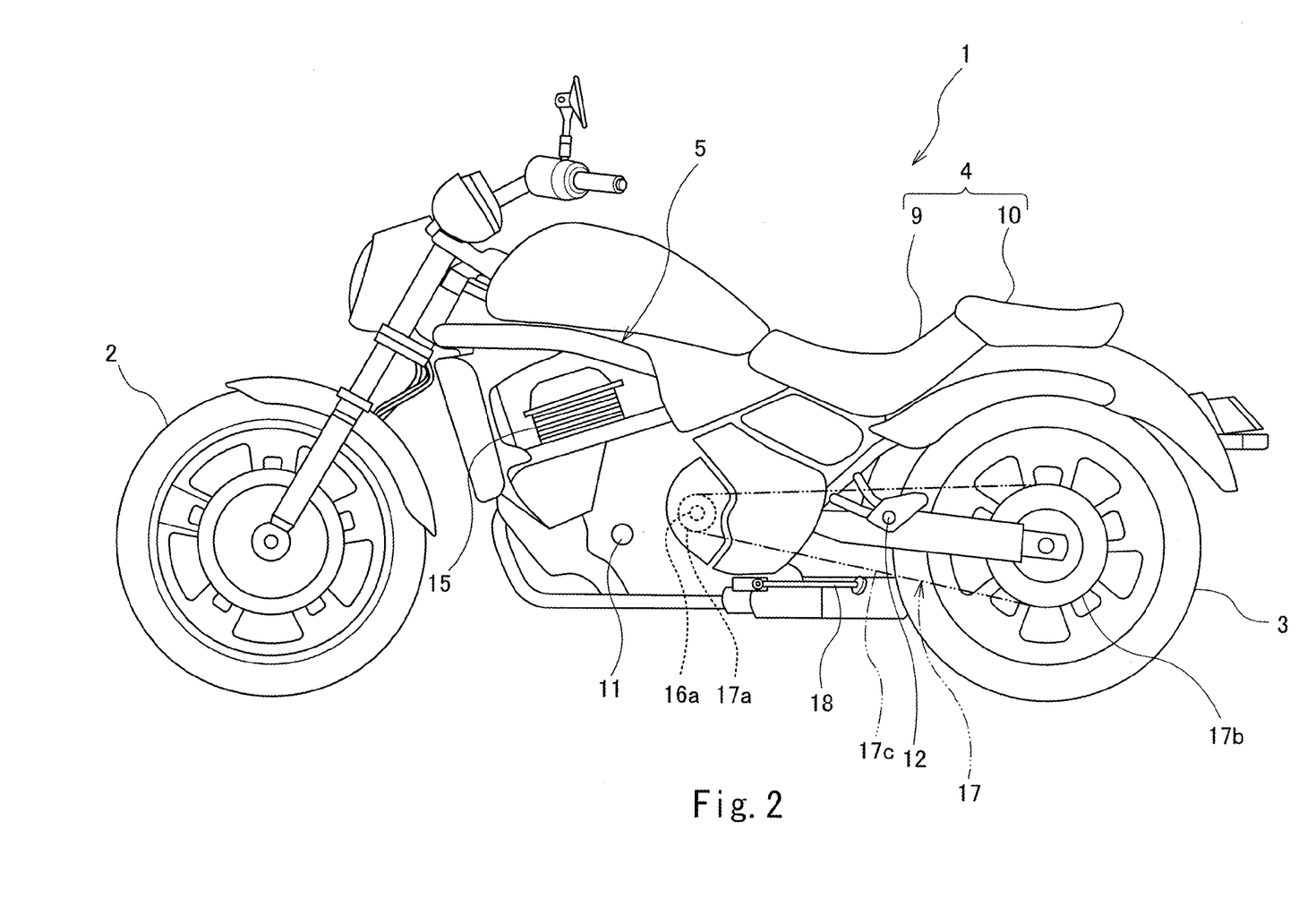
FIG. 2 is a left side view of the motorcycle according to the embodiment.

FIG. 1 is a right side view of a motorcycle 1 according to the embodiment. FIG. 2 is a left side view of the motorcycle 1 according to the embodiment. As shown in FIG. 1, the motorcycle 1 includes a front wheel 2, a rear wheel 3 which is a drive wheel, a seat 4 placed between the front wheel 2 and the rear wheel 3, and a vehicle body frame 5 placed between the front wheel 2 and the rear wheel 3. The front wheel 2 is rotatably connected to the lower end portion of a front fork 6 extending substantially vertically. A handle 7 extending in the rightward and leftward direction is rotatably attached to the upper end portion of the front fork 6 via a bracket and a steering shaft (not shown). The handle 7 is located above the upper surface of a fuel tank 8 mounted onto the vehicle body frame 5.

The seat 4 is placed rearward relative to the fuel tank 8. Specifically, a rider seat 9 on which the rider can be seated is placed behind the fuel tank 8, and a tandem seat 10 on which a passenger can be seated is placed behind the rider seat 9. The center portion of the rider seat 9 in a forward and rearward direction is located below the both end portions of the rider seat 9 in the forward and rearward direction. The lower surface of the rider seat 9 is concaved upward to have an inverted recess shape. In other words, below the rider seat 9, a space with a convex shape which swells upward is formed. In front of and below the rider seat 9, foot rests 11 on which the rider straddling the rider seat 9 rests their feet are provided on the right and left sides of the vehicle body. Also, in front of the rear wheel 3, foot rests 12 on which a passenger straddling the tandem seat 10 rests their feet are provided on the right and left sides of the vehicle body.

The rear wheel 3 is supportedly mounted to the vehicle body frame 5 via a swing arm 13. The front end portion of the swing arm 13 is coupled to a front frame 20 of the vehicle body frame 5 such that the swing arm 13 is rotatable. The rear end portion of the swing arm 13 supports an axle 3a of the rear wheel 3 such that the swing arm 13 is vertically pivotable. The structure of the swing arm 13 will be described in detail later. A rear fender 14 is placed above the rear wheel 3 to overlap with the rear wheel 3 when viewed from the side.

The motorcycle 1 includes an engine (motor) 15 placed between the front wheel 2 and the rear wheel 3. The engine 15 is an exemplary driving power source for rotating the rear wheel 3 as the drive wheel. The engine 15 is supportedly mounted to the front frame 20 of the vehicle body frame 5. Driving power generated by the engine 15 is transmitted to the rear wheel 3 through a clutch and a transmission 16, and then through a driving power transmission mechanism 17 placed on the left side of the vehicle body. As shown in FIG. 2, the driving power transmission mechanism 17 includes a drive sprocket 17a secured to an output shaft 16a of the transmission 16, a driven sprocket 17b secured to the rear wheel 3, and a chain 17c wrapped around the drive sprocket 17a and the driven sprocket 17b. The motorcycle 1 includes a side stand 18 placed on the left side of the vehicle body and rearward relative to the left foot rest 11.

[Vehicle Body Frame]

Figure 3:
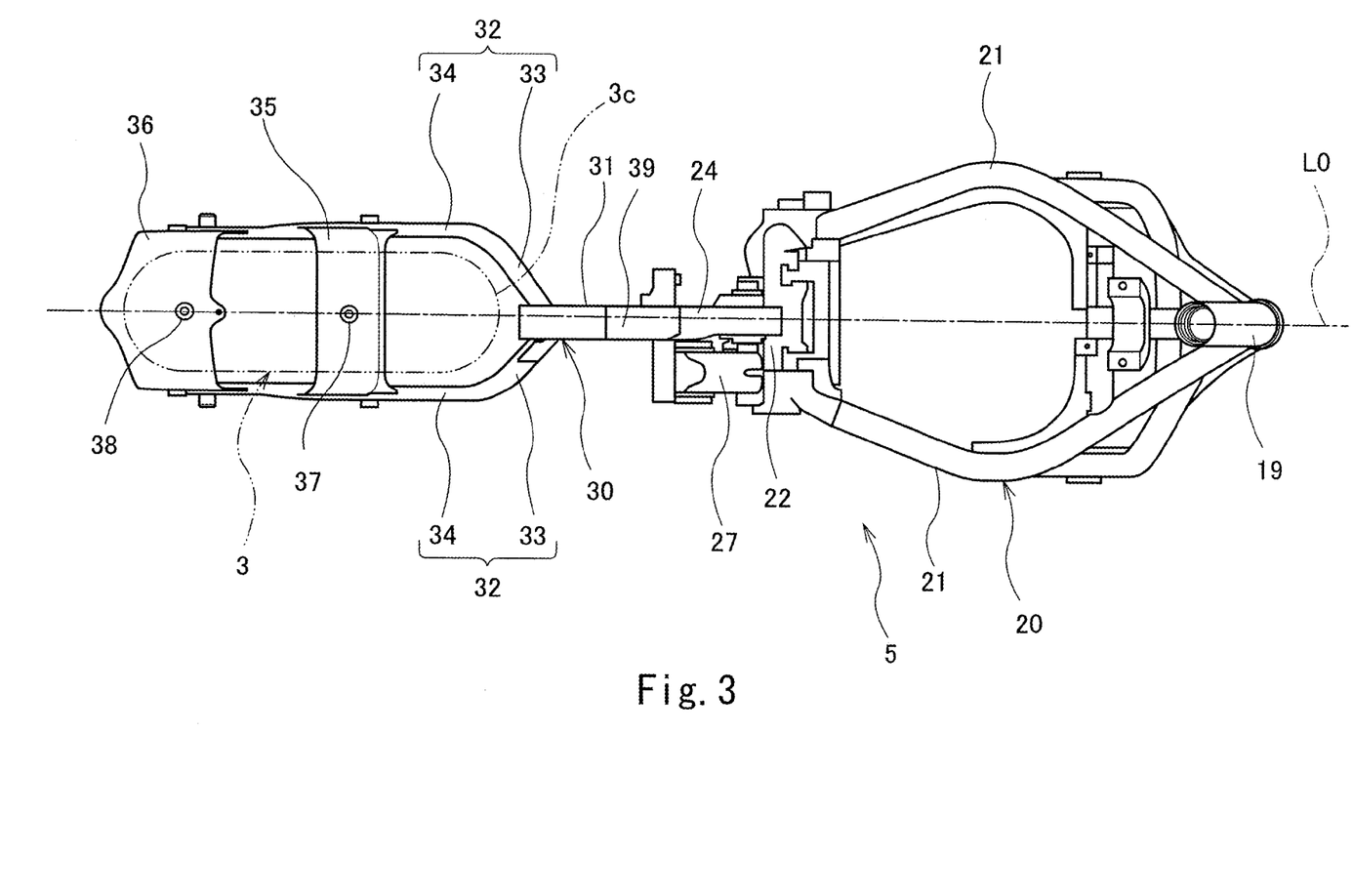
FIG. 3 is a plan view of a vehicle body frame of the motorcycle of FIGS. 1 and 2, showing the configuration of the frame members of the vehicle body frame when viewed from above.
Figure 4:
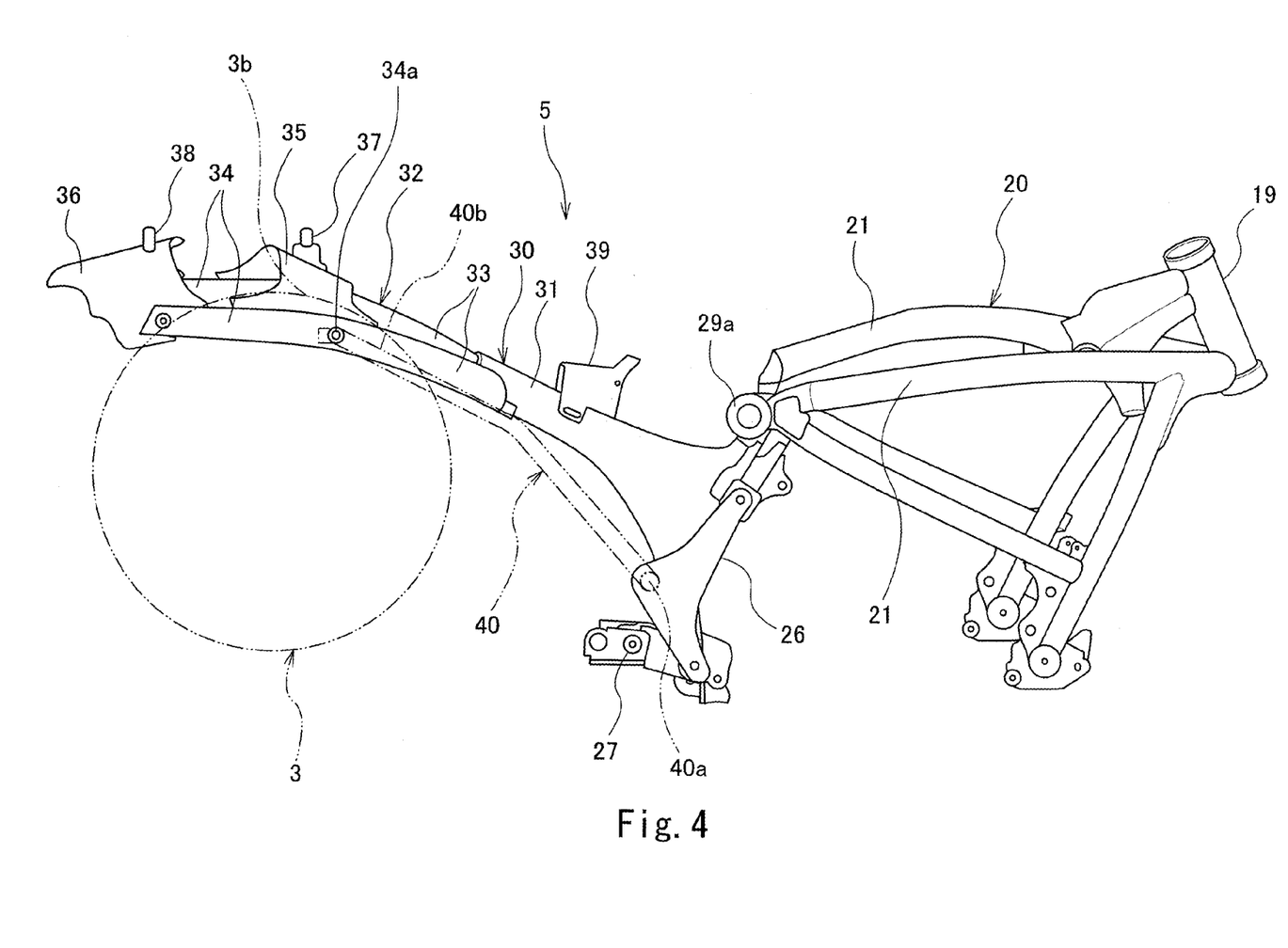
FIG. 4 is a right side view of the vehicle body frame of FIG. 3.
Figure 5:
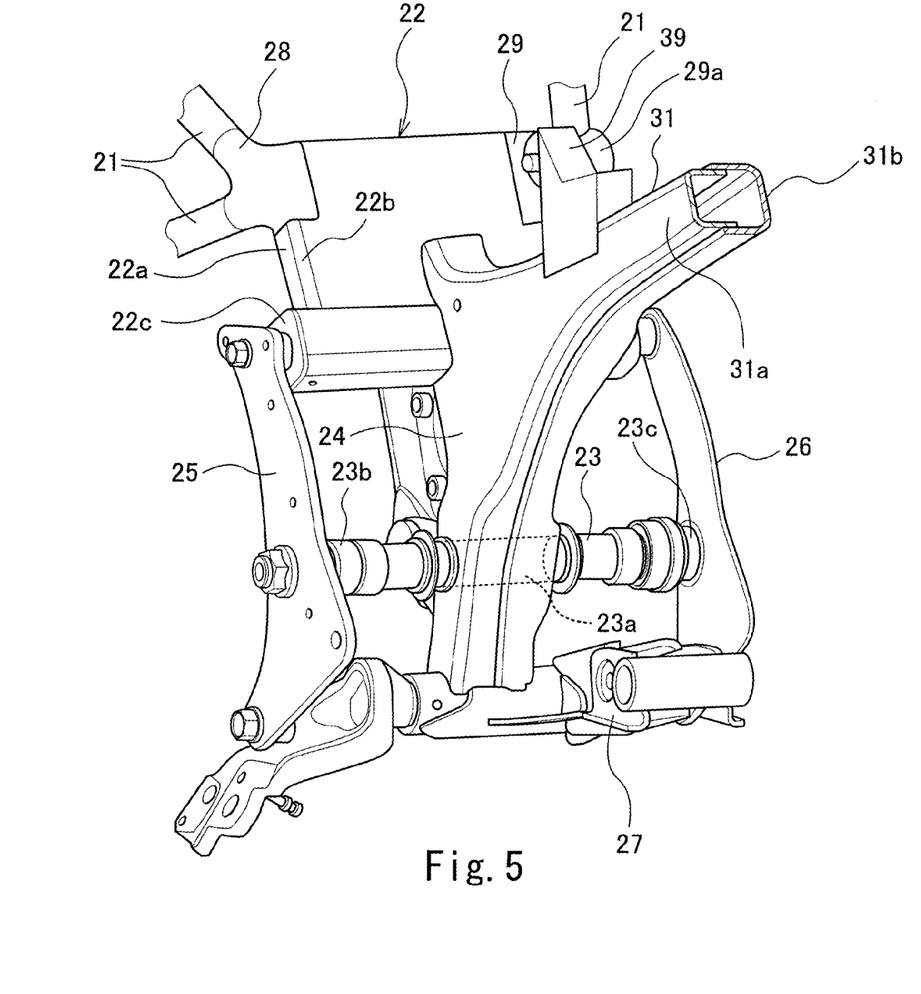
FIG. 5 is a perspective view showing a portion of the vehicle body frame of FIG. 3, from the left and rear.
Figure 6:
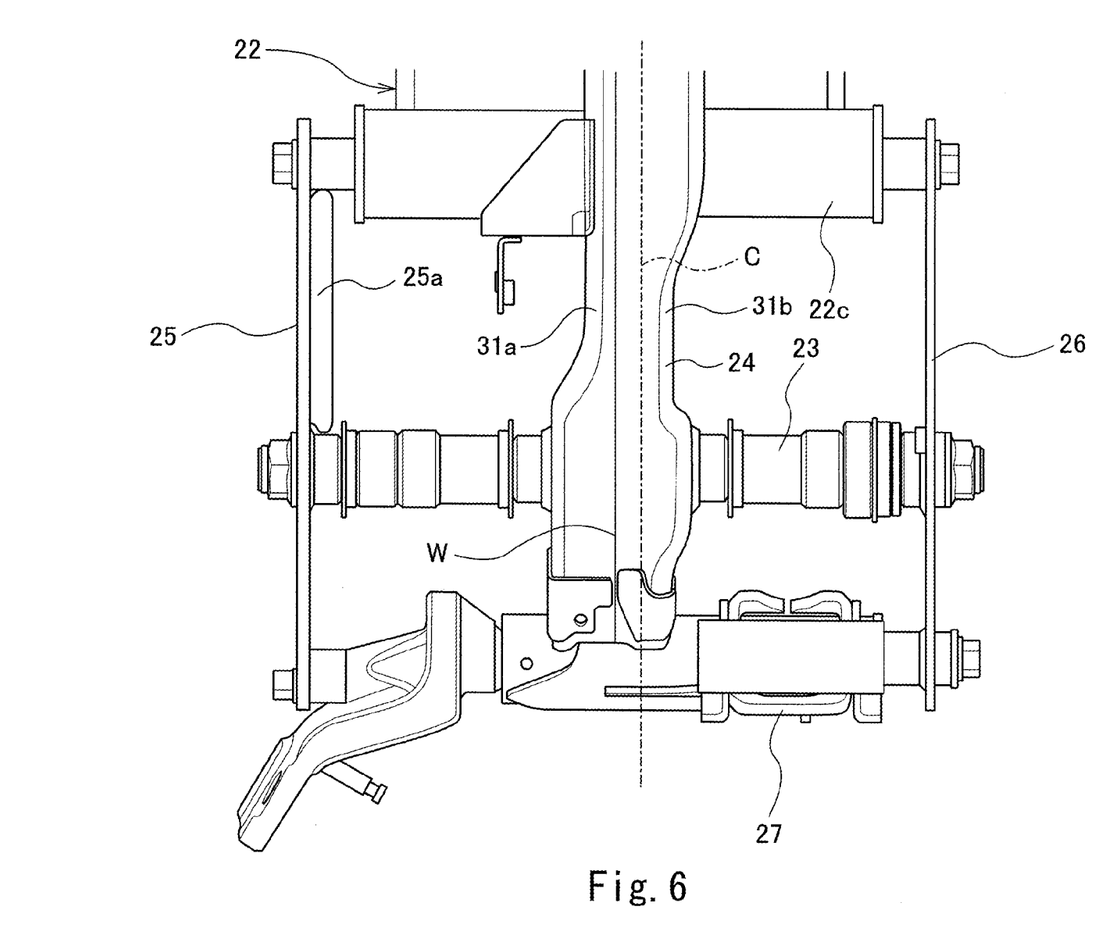
FIG. 6 is a rear view of a portion of the vehicle body frame of FIG. 3.

FIG. 3 is a plan view of the vehicle body frame 5 of the motorcycle 1 of FIGS. 1 and 2, showing the configuration of the frame members of the vehicle body frame 5 when viewed from above. In FIG. 3, a pair of left and right pivot plate members 25, 26 and a pair of reinforcement frames 40 are not shown. FIG. 4 is a right side view of the vehicle body frame 5 of FIG. 3. FIG. 5 is a perspective view showing a portion of the vehicle body frame 5 of FIG. 4, from the left and rear. FIG. 6 is a rear view of a portion of the vehicle body frame 5 of FIG. 3.

As shown in FIGS. 3 and 4, the vehicle body frame 5 includes a head pipe 19, the front frame 20 extending rearward from the head pipe 19, a seat frame 30 connected to the front frame 20, and the reinforcement frames 40 connecting the front frame 20 to the seat frame 30. The front frame 20 supports the front wheel 2 via the front fork 6. The front frame 20 includes a pair of right and left main frame members 21, a cross member 22, a pivot frame member 24, the pair of left and right pivot plate members 25, 26, and a link fastening frame member 27.

As shown in FIG. 3, the pair of right and left main frame members 21 extend rearward from the lower portion of the head pipe 19, forming a spacing between them in the rightward and leftward direction. The pair of right and left main frame members 21 constitute a twin frame. Each of the pair of right and left main frame members 21 includes two frame members such as round pipes which are disposed at an upper side and a lower side, respectively (see FIG. 4). The rear ends of the upper and lower frame members of the left main frame member 21 are joined together and integrated by a left joint member 28. The rear ends of the upper and lower frame members of the right main frame member 21 are joined together and integrated by a right joint member 29. The integrated frame members of the right and left main frame members 21 are coupled to the cross member 22 (see FIG. 5). The joint members 28, 29 correspond to the rear end portions of the main frame members 21, respectively. The joint members 28, 29 are placed outward in the vehicle width direction relative to a vehicle body center line L0. The right joint member 29 for integrating the rear ends of the upper and lower frame members of the right main frame member 21 is formed with a suspension support section 29a for supporting a rear suspension 50.

As shown in FIG. 5, the cross member 22 includes two steel plates 22a, 22b which are joined together, and a square pipe 22c welded to the steel plates 22a, 22b. The pivot frame member 24 extends downward from the center portion of the cross member 22 in the vehicle width direction.

The pivot frame member 24 is provided with a pivot shaft 23 extending in the vehicle width direction. The swing arm 13 and the front frame 20 are connected to each other by the pivot shaft 23. The swing arm 13 is pivotable around the pivot shaft 23. The pivot shaft 23 penetrates the pivot frame member 24 in the vehicle width direction. The intermediate portion 23a of the pivot shaft 23 is held by the pivot frame member 24. Hereinafter, the pivot frame member 24 will be sometimes referred to as the intermediate support member of the front frame 20. When viewed from above, the pivot frame member 24 is placed to overlap with the vehicle body center line L0 extending in the forward and rearward direction through the center of the head pipe 19. More specifically, the pivot frame member 24 is placed on one side (in the present embodiment, right side) in such a manner that the center axis of the pivot frame member 24 in the vehicle width direction extends in the forward and rearward direction to be rightward relative to the vehicle body center line L0 (see FIG. 3).

As shown in FIG. 5, the left and right end portions 23b, 23c of the pivot shaft 23 are supported by the left and right pivot plate members 25, 26, respectively. Hereinafter, the pivot plate members 25, 26 will be sometimes referred to as the end portion support members of the front frame 20. The left and right pivot plate members 25, 26 are placed leftward or rightward relative to the pivot frame member 24, respectively. The left and right pivot plate members 25, 26 are fastened to the square pipe 22c of the cross member 22, the pivot shaft 23, and a pipe extending from the lower end of the pivot frame member 24 to the left and to the right in the vehicle width direction, by use of bolts. In this configuration, the pair of left and right pivot plate members 25, 26 serve to reinforce the pivot frame member 24.

As shown in FIG. 6, the left pivot plate member 25 is formed with a rib 25a on an inner surface thereof in the vehicle width direction. The thickness of the right pivot plate member 26 in the vehicle width direction may be set to be smaller than that of the left pivot plate member 25 in the vehicle width direction.

Figure 7:
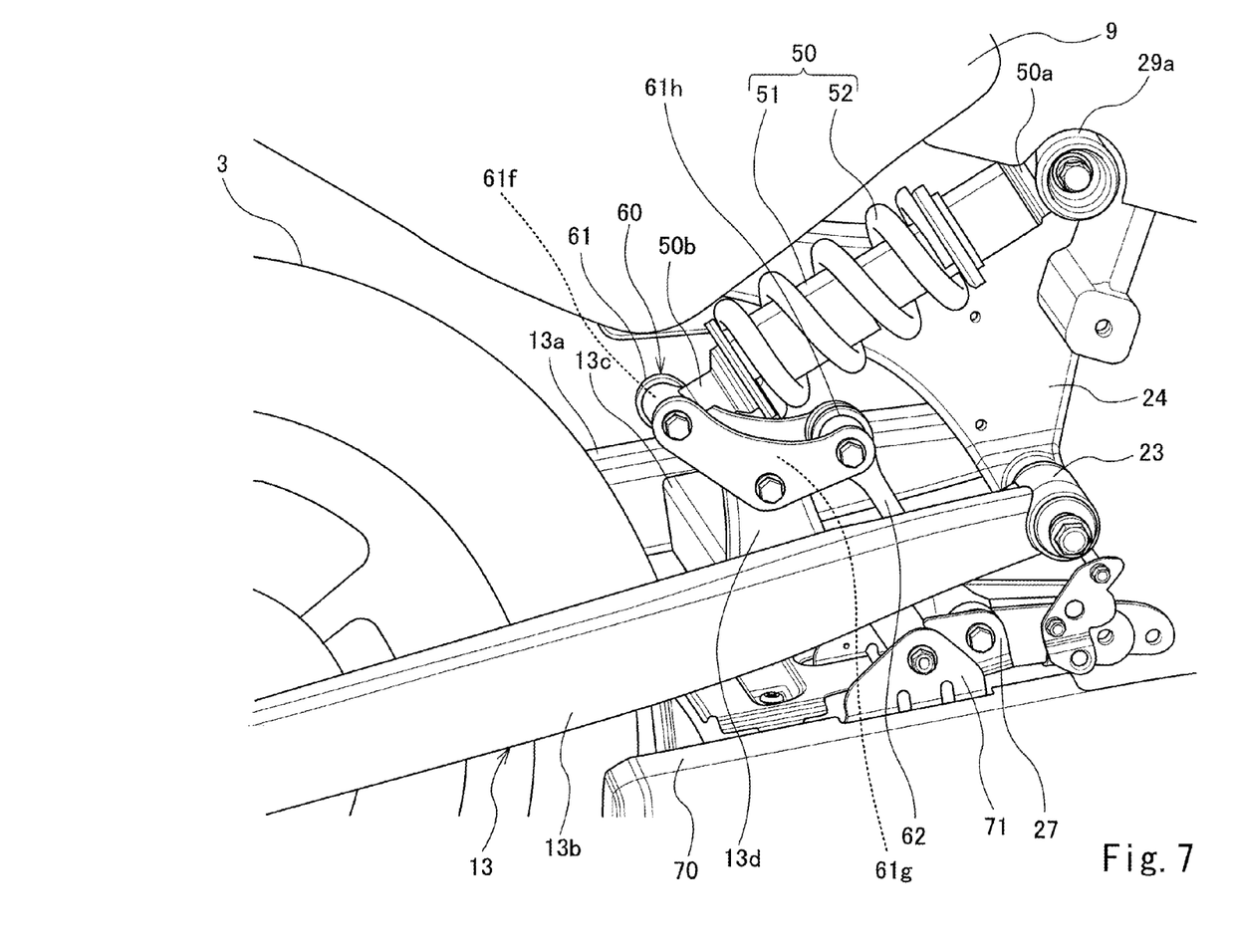
FIG. 7 is an enlarged perspective view showing from the right, a region including a swing arm and a rear suspension of the motorcycle of FIG. 1.

FIG. 7 is an enlarged perspective view showing, from the right, a region including the swing arm 13 and the rear suspension 50 of the motorcycle 1 of FIG. 1. As shown in FIGS. 5 to 7, the link fastening frame member 27 extends rearward from the lower end of the pivot frame member 24. The link fastening frame member 27 is located between the pivot frame member 24 and the right pivot plate member 26 in the vehicle width direction. The link fastening frame member 27 includes a pipe frame or the like extending in the vehicle width direction. One end portion of a link mechanism 60 which will be described later is coupled to the link fastening frame member 27. A muffler mounting bracket 71 for supporting a muffler 70 is placed rearward relative to the link fastening frame member 27 and above the muffler 70. In the present embodiment, the link fastening frame member 27 is integrated with the muffler mounting bracket 71.

As shown in FIGS. 3 and 4, the seat frame 30 extends rearward from the center in the vehicle width direction, of the rear end portion of the front frame 20. The seat frame 30 includes a front section 31 and a pair of rail sections 32 coupled to the rear end of the front section 31.

The front section 31 comprises a single frame member extending in the forward and rearward direction. When viewed from above, the front section 31 is placed to overlap with the vehicle body center line L0 extending in the forward and rearward direction through the center of the head pipe 19. More specifically, the front section 31 is placed on one side (in the present embodiment, right side) in such a manner that the center axis of the front section 31 in the vehicle width direction extends in the forward and rearward direction to be rightward relative to the vehicle body center line L0. Because of this layout, there is a space in which components are placed, on the other side in the vehicle width direction (in the present embodiment, on the left side) relative to the front section 31. For example, the components such as an ABS unit or a battery can be placed in a region that is leftward in the vehicle width direction relative to the front section 31. In a location that is rightward in the vehicle width direction relative to the front section 31, the rear suspension 50 is located adjacent to the front section 31 (see FIGS. 1 and 7).

In the present embodiment, the front section 31 and the pivot frame member 24 have a unitary structure. As shown in FIG. 5, the front section 31 and the pivot frame member 24 have a closed cross-section structure including a pair of left and right plate members 31a, 31b which are joined together from the left and right, and welded together. The front section 31 and the pivot frame member 24 have an inner hollow space. As shown in FIG. 6, a weld line W of an interface between the plate member 31a and the plate member 31b conforms to the center of the square pipe 22c of the cross member 22 or the pivot shaft 23 in the vehicle width direction, and is located inward in the vehicle width direction relative to a center line C of branch sections 33 and rear sections 34 in the vehicle width direction.

The front end of the front section 31 is welded to the cross member 22. A seat support 39 for supporting the rider seat 9 is placed at substantially the center of the front section 31 in the forward and rearward direction. The pair of rail sections 32 are connected to the rear end of the front section 31.

As shown in FIG. 3, the pair of rail sections 32 extend rearward from the rear end of the front section 31. The pair of rail sections 32 include a pair of frame members, respectively, extending in the forward and rearward direction. Each of the pair of rail sections 32 includes the branch section 33 and the rear section 34. The pair of right and left branch sections 33 extend from the rear end of the front section 31, and obliquely rearward, forming a spacing between the branch sections 33 in the vehicle width direction. The pair of right and left rear sections 34 extend in the forward and rearward direction, continuously with the rear ends of the pair of branch sections 33 and along the vehicle body center like L0. In brief, the seat frame 30 includes the front section 31, the branch sections 33, and the rear sections 34. The rear sections 34 correspond to the rear end portions of the rail sections 32, respectively.

As shown in FIG. 3, the pair of rear sections 34 are placed to be spaced apart from each other in locations that are outward in the vehicle width direction relative to the side surface of the rear wheel 3. The rear sections 34 are located above the axle 3a of the rear wheel 3. As shown in FIG. 4, a portion of the upper portion 3b of the rear wheel 3 can be accommodated in a space surrounded by the pair of rear sections 34. Specifically, in a state in which the swing arm 13 is pivoted to be closest to the pair of right and left rear sections 34, portions of the rear sections 34 overlap with a portion of the rear wheel 3 when viewed from the side.

The center portions of the pair of right and left rear sections 34 in the forward and rearward direction are connected to each other in the rightward and leftward direction by a first bridge section 35. The rear end portions of the pair of right and left rear sections 34 in the forward and rearward direction are connected to each other in the rightward and leftward direction by a second bridge section 36. A vertical clearance formed between the rear wheel 3 and each of the first and second bridge sections 35, 36 connecting the pair of rear sections 34 in the rightward and leftward direction is set to a requisite minimum value.

As shown in FIG. 4, a first protruding portion 37 protrudes upward from the upper surface of the first bridge section 35. A fastening member used to fasten the rear end of the rider seat 9 is inserted into the first protruding portion 37 to mount the rider seat 9 onto the seat frame 30. A second protruding portion 38 protrudes upward from the upper surface of the second bridge section 36. A fastening member used to fasten the tandem seat 10 is inserted into the second protruding portion 38 to mount the tandem seat 10 onto the seat frame 30.

As shown in FIG. 4, the front frame 20 and the seat frame 30 are connected to each other by the reinforcement frames 40. Although the reinforcement frame 40 provided on the right side of the vehicle body will be mainly described below, the vehicle body frame 5 includes the pair of reinforcement frames 40, and the front frame 20 and the seat frame 30 are connected to each other by the reinforcement frame 40 on the left side. The reinforcement frame 40 comprises a tubular pipe member or the like having an inner hollow space. The front end portion 40a of the reinforcement frame 40 is connected to the pivot plate member 26 of the front frame 20. A boss 34a protrudes from the outer side surface in the vehicle width direction, of the rear section 34 of the seat frame 30. The rear end portion 40b of the reinforcement frame 40 is connected to the rear section 34 by the boss 34a. Thus, the reinforcement frame 40 is a member which serves to increase the strength of the vehicle body frame 5 by connecting the front frame 20 to the seat frame 30.

[Swing Arm]

As shown in FIGS. 1 and 7, the front end of the swing arm 13 is connected to the pivot shaft 23 of the front frame 20, while the rear end of the swing arm 13 supports the axle 3a of the rear wheel 3. In other words, the swing arm 13 is rotatably connected to the front frame 20 and supports the rear wheel 3 in such a manner that the swing arm 13 is vertically pivotable around the pivot shaft 23 at which the swing arm 13 is connected to the front frame 20. In the present embodiment, the swing arm 13 has a substantially-H shape. The swing arm 13 includes a pair of left and right arm members 13a, 13b extending in the forward and rearward direction and a cross member 13c connecting the pair of left and right arms members 13a, 13b to each other in the rightward and leftward direction.

Like the pivot frame member 24 and the front section 31, the swing arm 13 has a closed cross-section structure in which a pair of left and right plate members 13e, 13f (see FIG. 8) are joined together from the left and right, to form an inner hollow space.

A spacing or distance in the vehicle width direction between the left arm member 13a and the right arm member 13b is varied in the forward and rearward direction and is smaller as the left and right arm members 13a, 13b become closer to the pivot frame member 24. In other words, the front ends of the left and right arm members 13a, 13b are located inward in the vehicle width direction relative to the rear ends of the left and right arm members 13a, 13b, respectively. Therefore, the dimension in the vehicle width direction, of a portion of the swing arm 13, which is below the rider seat 9, is smaller. Also, the vertical thickness of the swing arm 13 is varied in the forward and rearward direction. To optimize the stiffness of the swing arm 13, the left and right arm members 13a, 13b are configured such that the vertical thickness of the front ends is smaller than that of the rear ends.

The rear suspension 50 is placed above the swing arm 13. Now, the configuration of the rear suspension 50 and the configuration of the link mechanism 60 will be described.

[Rear Suspension]

As shown in FIGS. 1 and 7, the rear suspension 50 is disposed on a side (right side of the vehicle body) that is opposite in the vehicle width direction to the side (left side of the vehicle body) on which the driving power transmission mechanism 17 and the side stand 18 are disposed. The rear suspension 50 is positioned adjacent to the front section 31 of the seat frame 30 (in the present embodiment, in a location that is rightward relative to the front section 31) in the vehicle width direction. Since the front section 31 is placed on one side (in the present embodiment, right side) in such a manner that its center axis in the vehicle width direction extends in the forward and rearward direction to be rightward relative to the vehicle body center line L0 as described above, the rear suspension 50 is located rightward relative to the vehicle body center line L0 and extends in the forward and rearward direction. The phrase "the rear suspension 50 extends in the forward and rearward direction" is meant to include a case where the center axis of the rear suspension 50 extends to be inclined in the forward and rearward direction from a vertical direction that is perpendicular to a horizontal plane, as well as a case where the center axis of the rear suspension 50 extends in parallel with the horizontal plane. In other words, the phrase "the rear suspension 50 extends in the forward and rearward direction" is meant to include a case where the rear suspension 50 is placed such that the vertical dimension of the rear suspension 50 is smaller than that in a case where the center axis of the rear suspension 50 extends vertically.

In the present embodiment, the front portion 3c of the rear wheel 3 has a curved shape in which the center portion in the vehicle width direction extending through the vehicle body center line L0 protrudes farther radially outward than the outer portions in the vehicle width direction (see FIG. 3). The rear suspension 50 is placed outward (in the present embodiment, rightward) in the vehicle width direction relative to the center portion in the vehicle width direction, of the front portion 3c of the rear wheel 3.

Figure 8:
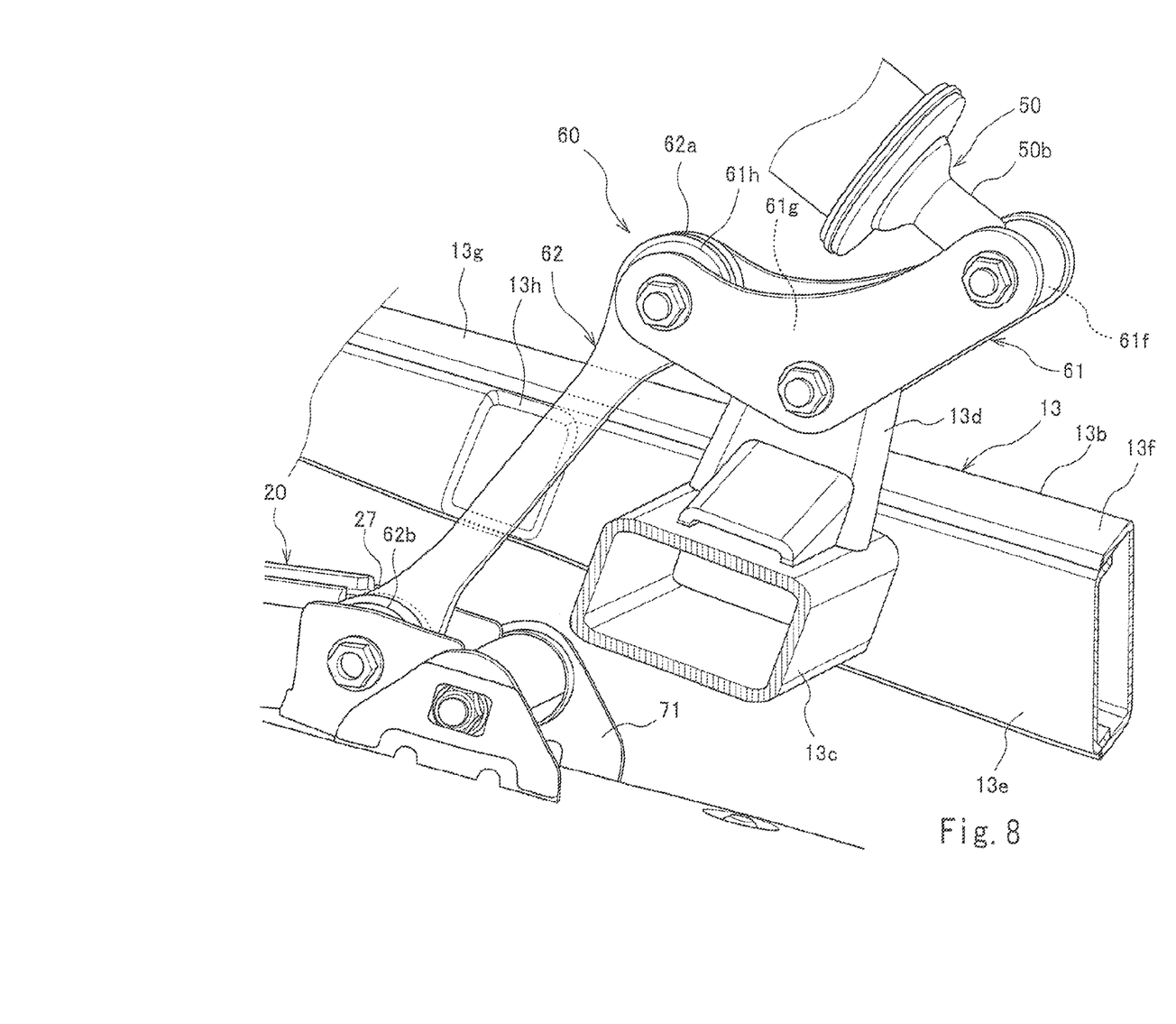
FIG. 8 is an enlarged perspective view showing a right side region from inside in a vehicle width direction, the right side region including the swing arm and the rear suspension of the motorcycle of FIG. 1.

FIG. 8 is an enlarged perspective view showing a right side region from inside in the vehicle width direction, the right side region including the swing arm 13 and the rear suspension 50 of the motorcycle 1 of FIG. 1. As shown in FIGS. 7 and 8, the rear suspension 50 couples the vehicle body frame 5 to the swing arm 13 via the link mechanism 60. In the present embodiment, the rear suspension 50 includes a damper unit 51 and a spring 52 placed to surround the outer periphery of the damper unit 51. The damper unit 51 includes a cylinder, a piston accommodated inside of the cylinder, and other parts. The cylinder contains a working fluid (oil). The oil filling a region in the vicinity of the piston generates a resistive force against the motion of the spring 52. In this way, the damper unit 51 controls the motion of the spring 52. The spring 52 is extended and contracted according to the motion of the rear wheel 3 during driving of the motorcycle 1. The rear suspension 50 is pivoted along with the swing arm 13 supporting the rear wheel 3.

As described above, the space with the convex shape which swells upward is formed below the rider seat 9 placed above the front section 31. During the pivot motion, the rear suspension 50 is accommodated in the space formed below the rider seat 9. In other words, the rear suspension 50 overlaps with the space formed below the rider seat 9 when viewed from above. The lower surface of the rider seat 9 protrudes farther outward in the vehicle width direction than the rear suspension 50 does. The front end portion 50a of the rear suspension 50 is located above the lower end portion of the seat surface of the rider seat 9.

The front end portion 50a of the rear suspension 50 is connected to the suspension support section 29a of the right joint member 29. Since the joint members 28, 29 correspond to the rear end portion of the main frame member 21, the rear suspension 50 is connected to one side (in the present embodiment, right side) in the vehicle width direction, of the rear end portion of the main frame member 21.

The rear end portion 50b of the rear suspension 50 is located above the swing arm 13, and rearward relative to the cross member 13c of the swing arm 13. The rear end portion 50b of the rear suspension 50 is mounted to the swing arm 13 via the link mechanism 60. Specifically, a coupling member 13d protrudes upward from the upper surface of the cross member 13c of the swing arm 13, and is connected to the link mechanism 60.

[Link Mechanism]

As shown in FIGS. 7 and 8, the link mechanism 60 is placed inward in the vehicle width direction relative to the swing arm 13. The link mechanism 60 includes a first link member 61 coupled to the rear suspension 50 and to the swing arm 13, and a second link member 62, one end of which is coupled to the first link member 61 and the other end of which is coupled to the front frame 20. A fulcrum is set in the portion of the link mechanism 60 which is coupled to the front frame 20. The point of effort is set in the portion of the link mechanism 60 which is coupled to the swing arm 13. The point of load is set in the portion of the link mechanism 60 which is coupled to the rear suspension 50.

Figure 9:
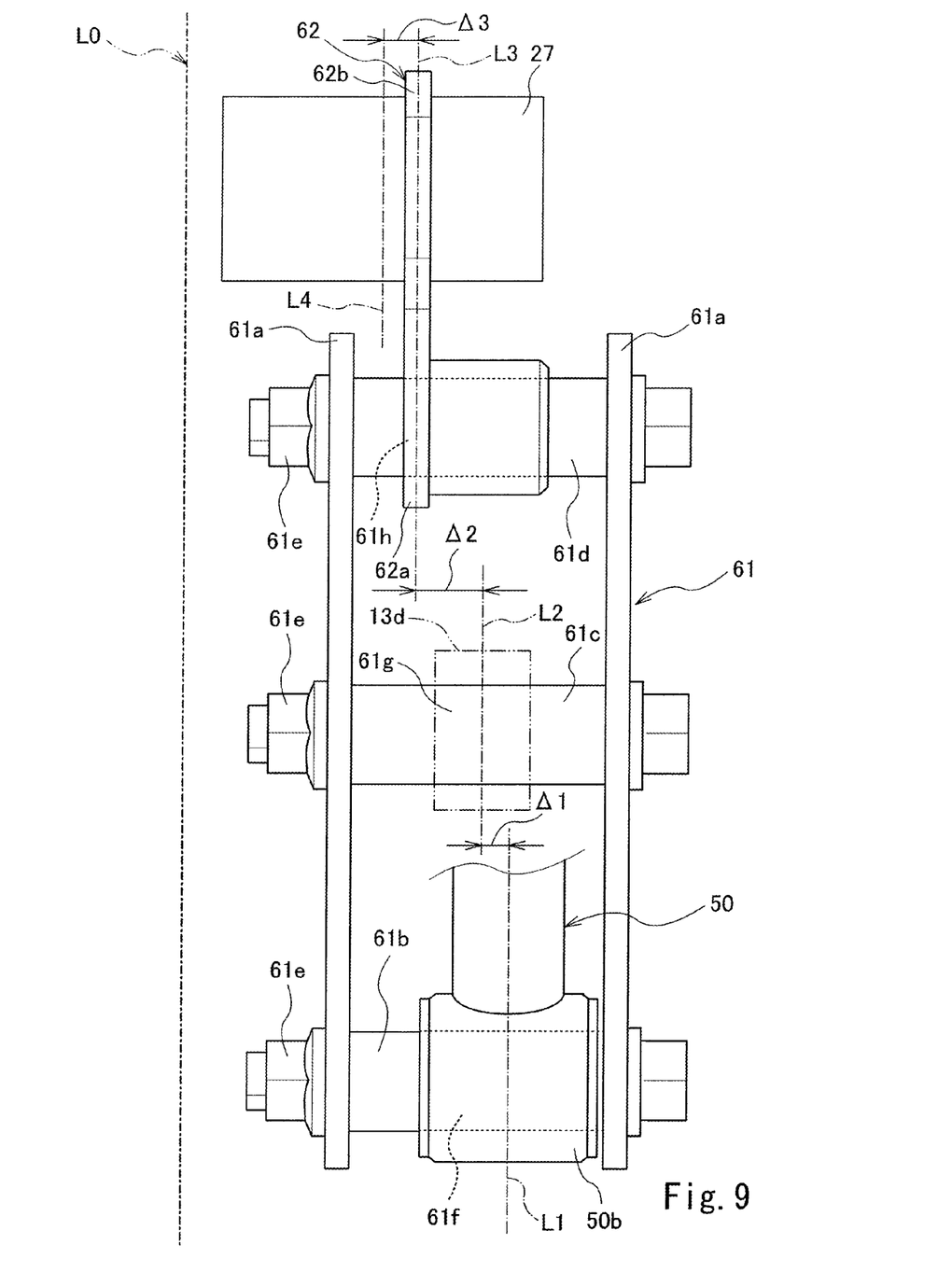
FIG. 9 is a view schematically showing a positional relationship between a link mechanism and the rear suspension of FIGS. 7 and 8, when viewed from above.

FIG. 9 is a view schematically showing a positional relationship between the rear suspension 50 and the link mechanism 60 of FIGS. 7 and 8, when viewed from above. As shown in FIG. 9, in the present embodiment, the first link member 61 includes a pair of right and left plates 61a of a substantially crescent shape, three pipes 61b, 61c, 61d connecting the right and left plates 61a to each other in the vehicle width direction, and three fastening members 61e for fastening the pair of plates 61a to the pipes 61b, 61c, 61d. Hereinafter, of the three pipes 61b, 61c, 61d, the pipe 61b connecting the rear end portions of the pair of plates 61a to each other in the vehicle width direction will be referred to as a first pipe, the pipe 61c connecting the substantially center portions of the pair of plates 61a in the forward and rearward direction to each other in the vehicle width direction will be referred to as a second pipe, and the pipe 61d connecting the front end portions of the pair of plates 61a to each other in the vehicle width direction will be referred to as a third pipe.

The first link member 61 also includes a suspension coupling section 61f rotatably coupled to the rear suspension 50, a swing arm coupling section 61g rotatably coupled to the swing arm 13, and a second link member coupling section 61h rotatably coupled to the second link member 62. Specifically, the suspension coupling section 61f couples the first pipe 61b to the rear end portion 50b of the rear suspension 50. The swing arm coupling section 61g couples the second pipe 61c to the coupling member 13d of the swing arm 13. The second link member coupling section 61h couples the third pipe 61d to the upper end portion 62a of the second link member 62. The coupling sections 61f, 61g, 61h of the first link member 61 are provided at different positions.

The suspension coupling section 61f is provided at the rear end portion of the first link member 61, and located inward in the vehicle width direction relative to the outer plate 61a (in the present embodiment, right plate 61a) of the first link member 61 in the vehicle width direction. In other words, the rear suspension 50 is located inward in the vehicle width direction relative to the outer side surface (in the present embodiment, right side surface) of the first link member 61 in the vehicle width direction.

Hereinafter, a center line extending in the forward and rearward direction through the center of the suspension coupling section 61f in the vehicle width direction will be indicated by "L1", a center line extending in the forward and rearward direction through the center of the swing arm coupling section 61g in the vehicle width direction will be indicated by "L2", a center line extending in the forward and rearward direction through the center of the front frame coupling section 62b in the vehicle width direction will be indicated by "L3", and a center line extending in the forward and rearward direction through the center of the link fastening frame member 27 in the vehicle width direction will be indicated by "L4". The center line L2 extends in the forward and rearward direction, forming a spacing Δ1 with the center line L1 in the rightward and leftward direction. In the present embodiment, the center line L2 of the swing arm coupling section 61g is located inward in the vehicle width direction relative to the center line L1 of the suspension coupling section 61f such that the center line L2 is offset by the spacing Δ1 with respect to the center line L1. The swing arm coupling section 61g is placed between the front end portion and the rear end portion of the first link member 61. In other words, the intermediate portion of the first link member 61 in the forward and rearward direction is mounted to the swing arm 13 via the coupling member 13d such that the first link member 61 is rotatable.

The center line L3 extends in the forward and rearward direction, forming a spacing Δ2 with the center line L2 in the rightward and leftward direction. In the present embodiment, the center line L3 of the second link member coupling section 61h is located inward in the vehicle width direction relative to the center line L2 of the swing arm coupling section 61g such that the center line L3 is offset by the spacing Δ2 with respect to the center line L2. In this structure, the suspension coupling section 61f is located outward in the vehicle width direction relative to the second link member coupling section 61h. The second link member coupling section 61h is provided at the front end portion of the first link member 61. The center line L4 extends in the forward and rearward direction, forming a spacing Δ3 with the center line L3 in the rightward and leftward direction. The center line L3 of the second link member coupling section 61h is located outward in the vehicle width direction relative to the center line L4 of the link fastening frame member 27 such that the center line L3 is offset by the spacing Δ3 with respect to the center line L4. The second link member coupling section 61h is located inward in the vehicle width direction relative to the inner side surface of the swing arm 13 in the vehicle width direction (see FIG. 8).

In the present embodiment, the second link member 62 comprises a rod member extending vertically. The second link member 62 couples the first link member 61 to the front frame 20. The second link member 62 is placed to pass through a space surrounded by the pair of left and right arm members 13a, 13b and the cross member 13c of the swing arm 13. As shown in FIG. 8, the swing arm 13 passes through a space that is rightward relative to the second link member 62. A region of a portion 13g of the swing arm 13 passing through the space that is rightward relative to the second link member 62, which faces the second link member 62, has a recess 13h which is concaved outward in the vehicle width direction.

As shown in FIGS. 8 and 9, the second link member 62 includes a first link member coupling section 62a, and a front frame coupling section 62b rotatably coupled to the front frame 20. Specifically, the first link member coupling section 62a is a portion of the second link member 62 which is rotatably coupled to the second link member coupling section 61h of the first link member 61. Therefore, the first link member coupling section 62a is provided at the upper end portion of the second link member 62.

The front frame coupling section 62b provided at the same position in the rightward and leftward direction as that of the first link member coupling section 62a is a portion of the second link member 62 which is rotatably coupled to the link fastening frame member 27 of the front frame 20. Thus, the front frame coupling section 62b is provided at the lower end portion of the second link member 62. Therefore, the front frame coupling section 62b is placed inward in the vehicle width direction relative to the swing arm coupling section 61g of the first link member 61. In other words, the lower end portion of the second link member 62 is offset to the left with respect to the rear end portion 50b of the rear suspension 50.

As described above, in the present embodiment, the rear suspension 50 is supportedly mounted to the swing arm 13 via the link mechanism 60. When the swing arm 13 is vertically pivoted during driving of the motorcycle 1, the first link member 61 coupled to the coupling member 13d of the swing arm 13 is rotated around the swing arm coupling section 61g, and the rear suspension 50 rotatably coupled to the rear end portion (suspension coupling section 61f) of the first link member 61 is extended and contracted in the forward and rearward direction (see FIGS. 7 and 8).

In the configuration in which the rear suspension 50 is supportedly mounted to the swing arm 13 via the link mechanism 60, a characteristic called a progressive characteristic can be obtained, in which a change in the amount of extension and contraction of the rear suspension 50 with respect to an increase in the amount of the pivot motion of the swing arm 13 is not constant, and is increased gradually, by setting a lever ratio (ratio of the amount of extension and contraction of the rear suspension 50 with respect to the amount of the pivot motion of the axle 3a of the rear wheel 3 (the amount of the pivot motion of the swing arm 13)) to a proper value.

In a case where the motorcycle 1 is driving on a flat road surface without much unevenness, an upward load generated from the rear wheel 3 is small, and a change in the amount of the pivot motion of the swing arm 13 is small. Correspondingly, a change in the amount of extension and contraction of the rear suspension 50 supportedly mounted to the swing arm 13 via the link mechanism 60 is small, and the repulsive force of the rear suspension 50 is small. On the other hand, if a pushing-up load generated from the rear wheel 3 is increased, and the amount of the pivot motion of the swing arm 13 is increased, in a case where the motorcycle 1 is driving on a bumpy road surface, a change in the amount of extension and contraction of the rear suspension 50 supportedly mounted to the swing arm 13 via the link mechanism 60, with respect to the increase in the amount of the pivot motion of the swing arm 13, is gradually increased, and the repulsive force of the rear suspension 50 with respect to the load is gradually increased. Since the rear suspension 50 is supportedly mounted to the swing arm 13 via the link mechanism 60, the rear wheel 3 can be securely grounded on the bumpy road surface, and an impact transmitted to the rider or the passenger can be mitigated, in the case where the motorcycle 1 is driving on the bumpy road surface as well as driving on the flat road surface. In this way, a more comfortable ride can be obtained.

[Advantages]

The motorcycle 1 configured as described above has advantages as follows.

Since the frame sections of the seat frame 30 are placed to be spaced apart from each other on both sides in the vehicle width direction relative to the rear wheel 3, an interference between the rear wheel 3 and the seat frame 30 can be prevented, and the height of the seat can be reduced. Further, since the rear suspension 50 connecting the vehicle body frame 5 to the swing arm 13 extends in the forward and rearward direction, the height of the seat can be reduced as compared to a case where the rear suspension extends vertically. In summary, since the frame sections of the seat frame 30 are placed to be spaced apart from each other on both sides in the vehicle width direction relative to the rear wheel 3, and the rear suspension 50 extends in the forward and rearward direction and is located on one side relative to the vehicle body center line L0, the height of the seat can be reduced, and the rider can ground their feet more easily.

Since the rear suspension 50 is connected to the vehicle body frame 5 and to the swing arm 13 via the link mechanism 60, and the lever ratio of the link mechanism 60 is set to a proper value, the amount of extension and contraction of the rear suspension 50 can be increased as compared to the amount of the pivot motion of the axle 3a of the rear wheel 3 (the amount of the pivot motion of the swing arm 13). In this configuration, even when the rear fender 14 is made closer to the rear wheel 3 to decrease the allowable amount of the pivot motion of the axle 3a of the wheel 3, a decrease in the amount of extension and contraction of the rear suspension 50 is suppressed. Therefore, the rear wheel 3 can be securely grounded on the road surface, and a more comfortable ride of the motorcycle 1 can be obtained.

The front portion 3c of the rear wheel 3 has a curved shape in which the center portion in the vehicle width direction extending through the vehicle body center line L0 protrudes farther radially outward than the outer portions in the vehicle width direction. Since the rear suspension 50 is placed rightward relative to the center portion in the vehicle width direction, of the front portion 3c of the rear wheel 3, an interference of the rear suspension 50 with the rear wheel 3 can be prevented.

Since the rear suspension 50 is placed rightward relative to the vehicle body center line L0, the rear wheel 3 can be placed in a location that is as forward as possible, while preventing an interference of the rear wheel 3 with the rear suspension 50. This makes it possible to reduce a distance (wheel base) between the front wheel 2 and the rear wheel 3, and reduce an inner wheel difference. Therefore, the turning performance of the motorcycle 1 can be improved.

The front end portion 50a of the rear suspension 50 is connected to the front frame 20 (right joint member 29) of the vehicle body frame 5, and the rear end portion 50b of the rear suspension 50 is connected to the front frame 20 (link fastening frame member 27) via the link mechanism 60. Therefore, when the vehicle body frame 5 is offset to the right or to the left in the vehicle width direction, the rear suspension 50 is offset in the same direction. As a result, an interference between the vehicle body frame 5 and the rear suspension 50 can be prevented easily.

The driving power transmission mechanism 17 and the side stand 18 are placed on the left side of the vehicle body. This makes it possible to prevent an interference between the rear suspension 50, and the driving power transmission mechanism 17 (e.g., chain 17c) and the side stand 18. Further, since the rear suspension 50 can be seen from the outside and can be noticed easily, the external appearance of the motorcycle 1 can be improved.

The rear suspension 50 is located adjacent to the front section 31 of the seat frame 30 (in the present embodiment, in the location that is rightward relative to the front section 31) in the vehicle width direction. This makes it possible to prevent an interference between the rear suspension 50 and the seat frame 30, and to easily ensure a region in which the rear suspension 50 can be extended and contracted in the forward and rearward direction.

The rear suspension 50 is connected to one side (in the present embodiment, right side) in the vehicle width direction, of the rear end portion (joint member 29) of the main frame member 21 which is placed rightward relative to the vehicle body center line L0. In this structure, the front end portion 50a of the rear suspension 50 is located rightward relative to the vehicle body center line L0. Therefore, the region in which the rear suspension 50 can be extended and contracted in the forward and rearward direction can be ensured more easily.

The rear end portion 50b of the rear suspension 50 is located above the swing arm 13. In this structure, the rear wheel 3 can be placed farther frontward, the wheel base can be reduced, and an inner wheel difference can be reduced. As a result, the turning performance of the motorcycle 1 can be further improved.

The link mechanism 60 includes the suspension coupling section 61f, the swing arm coupling section 61g, and the front frame coupling section 62b. The center line L1 of the suspension coupling section 61f is located outward in the vehicle width direction relative to the center line L2 of the swing arm coupling section 61g, and the center line L3 of the front frame coupling section 62b. In this configuration, the swing arm coupling section 61g, and the front frame coupling section 62b can be placed inward in the vehicle width direction, while placing the rear suspension 50 in a location that is as outward as possible in the vehicle width direction. As a result, the dimension in the vehicle width direction, of each of the swing arm 13 and the front frame 20, can be reduced.

The link mechanism 60 includes the first link member 61 and the second link member 62. The first link member 61 includes the suspension coupling section 61f, the swing arm coupling section 61g, and the second link member coupling section 61h. The second link member 62 includes the first link member coupling section 62a, and the front frame coupling section 62b. The center line L2 of the swing arm coupling section 61g of the first link member 61 is located inward in the vehicle width direction relative to the center line L1 of the suspension coupling section 61f of the first link member 61 such that the center line L2 is offset by the spacing Δ1 with respect to the center line L1. The center line L3 of the front frame coupling section 62b of the second link member 62 is located inward in the vehicle width direction relative to the center line L2 of the swing arm coupling section 61g such that the center line L3 is offset by the spacing Δ2 with respect to the center line L2. Since each of the swing arm coupling section 61g and the front frame coupling section 62b is offset inward in the vehicle width direction, the link mechanism 60 is offset in two stages. This makes it possible to prevent an interference between the swing arm 13 and the second link member 62, and easily place the front frame coupling section 62b of the second link member 62 inward in the vehicle width direction. In this way, the dimension in the vehicle width direction, of each of the swing arm 13 and the dimension of the front frame 20, can be reduced, and hence the dimension of the motorcycle 1 in the vehicle width direction can be reduced. As a result, the rider can ground their feet more easily.

The first link member 61 is rotatably coupled to the swing arm 13 by the swing arm coupling section 61g provided at the intermediate portion thereof, and the lower end portion (front frame coupling section 62b) of the second link member 62 is offset to the left with respect to the rear end portion 50b of the rear suspension 50. In this configuration, the lower end portion (front frame coupling section 62b) of the second link member 62 is located on the left side which is opposite of the rear suspension 50 in the rightward and leftward direction. Therefore, if the upward load generated from the rear wheel 3 is transmitted to the first link member 61 via the swing arm 13, this load can be dispersed in the rightward and leftward direction to the front frame 20 and to the rear suspension 50 in a well-balanced manner, without being transmitted to only one side in the rightward and leftward direction. Thus, since the rear end portion 50b of the rear suspension 50 and the second link member 62 of the link mechanism 60 are offset from each other, a structure which provides a good balance of dynamics can be realized.

The inner surface of the left pivot plate member 25 in the vehicle width direction is formed with the rib 25a. The rear suspension 50 is placed rightward relative to the vehicle body center line L0 and is indirectly supported by the pivot frame member 24 via the link mechanism 60 and the link fastening frame member 27. The rib 25a formed on the inner surface of the left pivot plate member 25 allows the left pivot plate member 25 to be supported by the pivot frame member 24 with a higher stiffness than that with which the right pivot plate member 26 is supported by the pivot frame member 24. In this way, the stiffness balance of the pivot frame member 24 in the rightward and leftward direction can be adjusted appropriately.

The link fastening frame member 27 of the front frame 20 is located between the pivot frame member (intermediate support member) 24 and the right pivot plate member 26 (one end portion support member in the vehicle width direction). In this configuration, when the upward load generated from the rear wheel 3 is transmitted to the link fastening frame member 27 via the swing arm 13, this load can be dispersed in the rightward and leftward direction to the pivot frame member 24 and to the right pivot plate member 26. This can reduce a stiffness required for the right pivot plate member 26 reinforcing the pivot frame member 24, which contributes to reduction of the weight of the right pivot plate member 26. The link fastening frame member 27 is integrated with the muffler mounting bracket 17 supporting the muffler 70. Thus, the number of members can be reduced.

The swing arm 13 has the closed cross-section structure in which the pair of plate members 13e, 13f are joined together from the left and right. In this structure, the cross-sectional shape of the swing arm 13 may be changed in the vertical direction and in the rightward and leftward direction depending on the space in which the swing arm 13 is placed. Thus, the weight of the swing arm 13 can be reduced while ensuring the stiffness of the swing arm 13.

The swing arm 13 includes the portion 13g passing through the space that is rightward relative to the second link member 62. A region of the portion 13g of the swing arm 13, which faces the second link member 62 in the vehicle width direction, has the recess 13h which is concaved outward in the vehicle width direction. In this configuration, the swing arm 13 can be placed inward in the vehicle width direction without an interference with the second link member 62, and thereby the dimension of the vehicle body in the vehicle width direction can be reduced. As a result, the rider can ground their feet more easily.

Since the rear fender 14 is placed to overlap with the rear wheel 3 when viewed from the side, the motorcycle 1 of the present embodiment is identified as a motorcycle of an American type (cruiser type) which has a characteristic in which its seat height is small. In the configuration of the present embodiment, the motorcycle 1 of the American type can reduce the seat height, provide a more comfortable ride, reduce the wheel base, and improve the turning performance.

The present invention is not limited to the above-described embodiment. The above-described configuration may be changed, added to, or deleted from, within a scope of the spirit of the preset invention. This will be described specifically below.

Although in the above-described embodiment, the rear suspension 50 is placed rightward relative to the vehicle body center line L0, it may be placed leftward relative to the vehicle body center line L0. Although in the above-described embodiment, the rear suspension 50 is placed inward in the vehicle width direction relative to the side surface of the rear wheel 3 on one side (in the present embodiment, right side) in the vehicle width direction, it may be placed outward relative to the side surface of the rear wheel 3 on one side in the vehicle width direction. In this configuration, the rear wheel 3 can be placed in the front more easily. Therefore, the wheel base can be further reduced.

Although in the above-described embodiment, the center line L1 of the suspension coupling section 61*f* of the first link member 61 is located outward in the vehicle width direction relative to the center line L2 of the swing arm coupling section 61*g* and the center line L3 of the front frame coupling section 62*b* of the second link member 62, it may be located outward in the vehicle width direction relative to at least one of the center line L2 of the swing arm coupling section 61*g* and the center line L3 of the front frame coupling section 62*b* of the second link member 62. The center line L2 of the swing arm coupling section 61*g* may be located outward in the vehicle width direction relative to the center line L3 of the second link member coupling section 61*h* and inward in the vehicle width direction relative to the center line L1 of the suspension coupling section 61*f*.

The configuration of the vehicle body frame 5 is not limited to the above-described embodiment. For example, although the front section 31 of the seat frame 30 comprises a single frame member extending in the forward and rearward direction, it may comprise a pair of right and left frame members extending rearward from the rear end of the front frame 20, forming a spacing therebetween. Although in the above-described embodiment, the swing arm 13 includes the pair of left and right arm members 13*a*, 13*b* which are supportedly mounted to the pivot shaft 23 of the front frame 20, it may include at least one of the pair of left and right arm members 13*a*, 13*b*. Although in the above-described embodiment, the motorcycle includes the engine 15 as the motor, the motor may be an electric motor.

The motorcycle of the present invention can obtain clear advantages that the height of the seat can be reduced, a more comfortable ride can be obtained, the wheel base can be reduced, and the turning performance of the vehicle body can be improved, which is effectively applicable to any motorcycle which can exhibit these advantages.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A motorcycle comprising:
    a front wheel;
    a rear wheel;
    a seat placed between the front wheel and the rear wheel;
    a vehicle body frame including a front frame supporting the front wheel, and a seat frame connected to the front frame and supporting the seat;
    a swing arm which is rotatably connected to the front frame and supports the rear wheel such that the swing arm is vertically pivotable around a location at which the swing arm is connected to the front frame; and
    a rear suspension which connects the vehicle body frame to the swing arm via a link mechanism and serves to damp a pivot motion of the swing arm, wherein
    the seat frame includes:
        a front section extending rearward from the front frame and supporting the seat;
        a pair of branch sections extending rearward from a rear end portion of the front section, forming a spacing between the branch sections in the vehicle width direction; and
        a pair of rear sections located on right and left sides relative to the rear wheel and extending rearward from rear end portions of the pair of branch sections, respectively,
    a pair of rail sections having rear end portions which are placed to be spaced apart from each other on both sides in a vehicle width direction relative to the rear wheel and located above an axle of the rear wheel, wherein each rail section of the pair of rail sections includes a respective branch section of the pair of branch sections and a respective rear section of the pair of rear sections,
    the rear suspension is placed on one side in the vehicle width direction relative to a vehicle body center line extending in a forward and rearward direction and extends in the forward and rearward direction, and
    the rear suspension is placed laterally in the vehicle width direction relative to the front section.

2. The motorcycle according to claim 1, wherein the rear suspension is connected to one side of a rear end portion of the front frame in the vehicle width direction.

3. The motorcycle according to claim 1, further comprising:
    a motor;
    a driving power transmission mechanism which transmits driving power from the motor to the rear wheel; and
    a side stand,
    wherein the driving power transmission mechanism and the side stand are placed on the other side in the vehicle width direction.

4. A motorcycle comprising:
    a front wheel;
    a rear wheel;
    a seat placed between the front wheel and the rear wheel;
    a vehicle body frame including a front frame supporting the front wheel, and a seat frame connected to the front frame and supporting the seat;
    a swing arm which is rotatably connected to the front frame and supports the rear wheel such that the swing arm is vertically pivotable around a location at which the swing arm is connected to the front frame; and
    a rear suspension which connects the vehicle body frame to the swing arm via a link mechanism and serves to damp a pivot motion of the swing arm, wherein
    the seat frame includes a pair of rail sections having rear end portions which are placed to be spaced apart from each other on both sides in a vehicle width direction relative to the rear wheel and located above an axle of the rear wheel,
    the rear suspension is placed on one side in the vehicle width direction relative to a vehicle body center line extending in a forward and rearward direction and extends in the forward and rearward direction, the link mechanism includes:
- a suspension coupling section rotatably coupled to the rear suspension;
- a swing arm coupling section rotatably coupled to the swing arm; and
- a front frame coupling section rotatably coupled to the front frame, and
- wherein the suspension coupling section is placed in such a manner that a center axis of the suspension coupling section in the vehicle width direction, the center axis extending in the forward and rearward direction, is located outward in the vehicle width direction relative to at least one of a center axis of the swing arm coupling section in the vehicle width direction, extending in the forward and rearward direction, and a center axis of the front frame coupling section in the vehicle width direction, extending in the forward and rearward direction.

5. The motorcycle according to claim 4,
wherein the link mechanism includes a first link member and a second link member,
wherein the first link member includes:
- the suspension coupling section rotatably coupled to a rear end portion of the rear suspension;
- the swing arm coupling section rotatably coupled to the swing arm; and
- a second link member coupling section rotatably coupled to the second link member,
- wherein the suspension coupling section, the swing arm coupling section, and the second link member coupling section of the first link member are provided at different positions, wherein the second link member includes:
- a first link member coupling section rotatably coupled to the second link member coupling section of the first link member; and
- the front frame coupling section rotatably coupled to the front frame,
- wherein the first link member coupling section and the front frame coupling section of the second link member are provided at different positions,
- wherein the center axis of the swing arm coupling section is located inward in the vehicle width direction relative to the center axis of the suspension coupling section, and
- wherein the center axis of the front frame coupling section is located inward in the vehicle width direction relative to the center axis of the swing arm coupling section.

6. The motorcycle according to claim 5,
wherein the swing arm includes a portion passing through a space that is rightward relative to the second link member, and
wherein a region of the portion of the swing arm passing through the space that is rightward relative to the second link member, the region facing the second link member, has a recess which is concaved outward in the vehicle width direction.

7. A motorcycle comprising:
a front wheel;
a rear wheel;
a seat placed between the front wheel and the rear wheel;
a vehicle body frame including a front frame supporting the front wheel, and a seat frame connected to the front frame and supporting the seat;
a swing arm which is rotatably connected to the front frame and supports the rear wheel such that the swing arm is vertically pivotable around a location at which the swing arm is connected to the front frame;
a rear suspension which connects the vehicle body frame to the swing arm via a link mechanism and serves to damp a pivot motion of the swing arm;
a muffler; and
a muffler mounting bracket supporting the muffler, wherein
the seat frame includes a pair of rail sections having rear end portions which are placed to be spaced apart from each other on both sides in a vehicle width direction relative to the rear wheel and located above an axle of the rear wheel,
the rear suspension is placed on one side in the vehicle width direction relative to a vehicle body center line extending in a forward and rearward direction and extends in the forward and rearward direction,
the front frame is provided with a pivot shaft supporting the swing arm such that the swing arm is pivotable,
the front frame includes an intermediate support member supporting an intermediate portion of the pivot shaft, and end portion support members supporting both end portions of the pivot shaft in the vehicle width direction, respectively, and
a portion of the front frame which is coupled to the link mechanism is provided between the intermediate support member and the end portion support member located on one side in the vehicle width direction and integrated with the muffler mounting bracket.

* * * * *